UNITED STATES PATENT OFFICE.

WILHELM HASENBACH, OF MANNHEIM, GERMANY.

PURIFYING LIQUID.

No. 836,034.     Specification of Letters Patent.     Patented Nov. 13, 1906.

Application filed August 24, 1906. Serial No. 331,903.

*To all whom it may concern:*

Be it known that I, WILHELM HASENBACH, a subject of the German Emperor, and a resident of Mannheim, Germany, have invented certain new and useful Improvements in Purifying Liquids, of which the following is a specification.

I have discovered that arsenious chlorid has such a great affinity for mineral oils that it can be separated from liquids by means of such oils. Therefore to free liquid which contains arsenious chlorid from the latter the said liquid is brought into intimate contact with the oil by shaking, stirring, or otherwise agitating the liquid and oil together. The oil absorbs the arsenious chlorid with avidity and the liquid is thus freed from arsenic. In treating the oil and liquid together it is preferable to agitate the mixture at a low temperature. When the liquid contains the arsenic in the form of arsenic compounds (other than arsenious chlorid) upon which the oil has not the action described, it is in many cases easy to convert such arsenic compounds into arsenious chlorid. For instance, weak hydrochloric acid containing arsenic can be treated by introducing gaseous hydrochloric acid into it, so that the arsenic is converted into arsenious chlorid, which can then be removed by means of oil, as described.

In treating sulfuric acid containing arsenic the arsenic can be converted into arsenious chlorid by introducing gaseous hydrochloric acid into the arsenical sulfuric acid and the arsenious chlorid be separated by means of oil, as described.

Having now particularly described and ascertained the nature of my said invention and in what manner the same is to be performed, I declare that what I claim is—

1. The herein-described process of purifying liquids from arsenious chlorid by treating such liquids with mineral oil, substantially as and for the purpose set forth.

2. The herein-described process of purifying liquids from arsenious chlorid by treating such liquids with mineral oil at a low temperature substantially as and for the purpose set forth.

3. The herein-described process of purifying liquids from compounds of arsenic by first converting the arsenic compound into arsenious chlorid and then separating the arsenious chlorid by treating the liquid with mineral oil substantially as and for the purpose set forth.

4. The herein-described process of purifying sulfuric acid containing arsenic by first saturating the said acid with hydrochloric acid and then treating it with mineral oil substantially as and for the purpose set forth.

In testimony whereof I have signed my name to this specification in the presence of two subscribing witnesses.

WILHELM HASENBACH.

Witnesses:
ALBERT SCHÜLE,
H. W. HARRIS.